US008206672B2

(12) United States Patent
Mukherjee et al.

(10) Patent No.: US 8,206,672 B2
(45) Date of Patent: Jun. 26, 2012

(54) PRODUCTION OF PHASE-PURE CERAMIC GARNET PARTICLES

(75) Inventors: Rajesh Mukherjee, Irvine, CA (US); Toshitaka Nakamura, Oceanside, CA (US); Sheng Li, Vista, CA (US); Brett T. Harding, Carlsbad, CA (US); Amane Mochizuki, San Diego, CA (US)

(73) Assignee: Nitto Denko Corporation, Osaka (JP)

( * ) Notice: Subject to any disclaimer, the term of this patent is extended or adjusted under 35 U.S.C. 154(b) by 426 days.

(21) Appl. No.: 12/500,956

(22) Filed: Jul. 10, 2009

(65) Prior Publication Data

US 2011/0006449 A1 Jan. 13, 2011

(51) Int. Cl.
*C23C 4/00* (2006.01)
(52) U.S. Cl. ............... 423/263; 423/593.1; 423/306; 423/326
(58) Field of Classification Search .............. 423/263, 423/305, 306, 326–334, 593.1
See application file for complete search history.

(56) References Cited

U.S. PATENT DOCUMENTS

| | | | |
|---|---|---|---|
| 4,575,609 A | 3/1986 | Fassel et al. | |
| 5,061,682 A | 10/1991 | Aksay et al. | |
| 5,077,267 A | 12/1991 | Engler et al. | |
| 5,369,091 A | 11/1994 | Fortunati et al. | |
| 5,401,484 A | 3/1995 | Wurmbauer et al. | |
| 5,447,708 A | 9/1995 | Helble et al. | |
| 5,599,511 A | 2/1997 | Helble et al. | |
| 5,625,256 A | 4/1997 | Tiedt et al. | |
| 5,644,193 A | 7/1997 | Matsuda et al. | |
| 5,989,648 A | 11/1999 | Phillips | |
| 6,180,029 B1 | 1/2001 | Hampden-Smith et al. | |
| 6,482,387 B1 | 11/2002 | Glgn et al. | |
| 6,656,588 B1 | 12/2003 | Laine et al. | |
| 6,884,514 B2 | 4/2005 | Simpson et al. | |
| 7,112,758 B2 | 9/2006 | Ma et al. | |
| 7,220,398 B2 | 5/2007 | Sutorik et al. | |
| 7,361,938 B2 | 4/2008 | Mueller et al. | |
| 7,959,885 B2* | 6/2011 | Li et al. ................. | 423/263 |
| 8,029,595 B2 | 10/2011 | Mukherjee et al. | |
| 2004/0101617 A1 | 5/2004 | Devi et al. | |
| 2006/0124951 A1 | 6/2006 | Sakata et al. | |
| 2007/0029291 A1 | 2/2007 | Boulos et al. | |
| 2008/0108496 A1 | 5/2008 | Gratson et al. | |
| 2008/0187746 A1 | 8/2008 | De Graaf et al. | |

FOREIGN PATENT DOCUMENTS

| | | | |
|---|---|---|---|
| JP | 2008-010791 | | 1/2008 |
| WO | WO 2007/107917 A3 | | 9/2007 |
| WO | 2008/112710 | * | 9/2008 |
| WO | WO 2008/112710 | | 9/2008 |

OTHER PUBLICATIONS

Hosokawa, S., Tanaka, Y., Iwamoto, S., and Inoue, M., Defect structure of rare earth aluminium garnets obtained by the glycothermal method. Journal of Alloys and Compounds, (2007).

Inoue, M., Otsu, H., Kominami, H., and Inui, T., Synthesis of Yttrium Aluminum Garnet by the Glycothermal Method. Journal of the American Ceramic Society, 74(6): 1452-1454 (1991).

Kagawa, M., Suzuki, M., Mizoguchi, Y., Hirai, T., and Syono, Y., Gas-phase synthesis of ultrafine particles and thin films of Y-Al-O by the spray-ICP technique. Journal of Aerosol Science, 24(3): 349-355 (1993).

Kasuya, R., Isobe, T., and Kuma, H., Glycothermal synthesis and photoluminescence of YAG:Ce3+ nanophosphors. Journal of Alloys and Compounds, 408-412: 820-823 (2006).

Kasuya, R., Isobe, T., Kuma, H., and Katano, J., Photoluminescence Enhancement of PEG-Modified YAG:Ce3+ Nanocrystal Phosphor Prepared by Glycothermal Method. Journal of Physical Chemistry B, 109: 22126-22130 (2005).

Kumar, et al., "RF Plasma Processing of Ultra-Fine Hydroxyaptite Powders", Journal of Materials Processing Technology, 113: 456-462 (2001).

Marchal, J., John, T., Baranwal, R., Hinklin, T., and Laine, R. M., Yttrium Aluminum Garnet Nanopowders Produced by Liquid-Feed Flame Spray Pyrolysis (LF-FSP) of Metalloorganic Precursors. Chemistry of Materials, 16: 822-831 (2004).

Mizoguchi, Y., Kagawa, M., Syono, Y., and Hirai, T., Film Synthesis of Y3Al5O12 and Y3Fe5O12 by the Spray-Inductively Coupled Plasma Technique. Journal of the American Ceramic Society, 84(3): 651-653 (2001).

Nyman, M., Caruso, J., Hampden-Smith, M. J., and Kodas, T. T., Comparison of Solid-State and Spray-Pyrolysis Synthesis of Yttrium Aluminate Powders. Journal of the American Ceramic Society, 80(5): 1231-1238 (1997).

Parukuttyamma, S. D., Margolis, J., Liu, H., Grey, C. P., Sampath, S., Herman, H., and Parise, J. B., Yttrium Aluminum Garnet (YAG) Films through a Precursor Plasma Spraying Technique. Journal of the American Ceramic Society, 84(8): 1906-1908 (2001).

Parukuttyamma, S. D., Margolis, J., Liu, H., Parise, J. B., Grey, C. P., Sampath, S., Gouma, P., and Herman, H., eds. Deposition and Characterization of Y3Al5O12 (YAG) Films and Powders by Plasma Spray Synthesis. MRS Fall Meeting (Symposium GG). vol. 658 MRS: Boston. pp. 6 (2000).

Ravi, B. G., Gandhi, a. S., Guo, X. Z., Margolies, J., and Sampath, S., Liquid Precursor Plasma Spraying of Functional Materials: A Case Study for Yttrium Aluminum Garnet (YAG). Journal of Thermal Spray Technology, 17(1): 82-90 (2008).

Buha, et al., "Nonaqueous Synthesis of Nanocrystalline Ind um Oxide and Zinc Oxide in the Oxygen-Free Solvent Acetonitrile," *Crystal Growth & Design* 2007, vol. 7, No. 1, pp. 113-116.

Kunjara Na Ayudha, et al., "Solvothermal Synthesis of ZnO with Various Aspect Ratios Using Organic Solvents," *Crystal Grown & Design*, 2006, vol. 6, No. 11, 2446-2450.

Inoue, et al., "Glycothermal synthesis of rare earth aluminum garnets," *Journal of Alloys and Compounds* (1995), 226, 146-151.

Inoue, et al., "Reaction of Aluminum Alkoxides with Various Glycols and the Layer Structure of Their Products", *J. Chem. Soc., Dalton Trans.*, 3331-3336 (1991).

Kasuya, et al., "Characteristic optical properties of transparent color conversion film prepared from YAG:Ce$^{3+}$ nanoparticles," *Appl. Phys. Lett.*, Sep. 14, 2007, vol. 91, Issue 11, pp. 111916-1 through 111916-3.

* cited by examiner

*Primary Examiner* — Steven Bos

(74) *Attorney, Agent, or Firm* — Knobbe, Martens, Olson & Bear, LLP

(57) ABSTRACT

Disclosed herein are processes for making a plurality of substantially phase-pure metal oxide particles, the particles comprising a garnet structure, the process comprising: subjecting a dispersion of precursors to a solvothermal treatment to form a garnet intermediate and applying a flow-based thermochemical process to said garnet intermediate.

29 Claims, 7 Drawing Sheets

US 8,206,672 B2

PRODUCTION OF PHASE-PURE CERAMIC GARNET PARTICLES

BACKGROUND OF THE INVENTION

1. Field of the Invention

This disclosure relates to preparation of rare earth materials, such as the preparation of phase-pure garnet particles.

2. Description of the Related Art

Direct production of garnets such as yttrium aluminum garnet (YAG) is possible via several different wet chemistry as well as solid state and combustion routes. For solid state or combustion synthesis, improving particle size control is a current research goal. On the other hand, a current goal in the area of wet chemical processes is reduction of organic contamination and defective crystalline structure. Improving any of these may improve the desirable properties of garnets for various applications viz. optical properties when used as phosphor hosts, lasing materials or scintillators.

Flow-based thermochemical syntheses techniques like thermal plasma based methods, flame spray pyrolysis, spray pyrolysis, and other processes of a similar nature are promising because they may reduce contaminants and improve control over particle shapes and sizes. These processes are also very suitable for continuous production compared to the batch processing nature of wet synthesis.

However, there is a need for a better method to create phase-pure polycrystalline garnet phase materials, using flow-based thermochemical synthesis methods. The current flow-based thermochemical methods tend to produce powders that are not phase-pure. The synthesized powders may contain garnets and other thermodynamic phases such as amorphous or different crystalline phases. These powders which are not phase-pure garnet material may not possess the desired characteristics that make garnet materials useful in many applications.

For example, there are several problems associated with the processing of yttrium aluminum garnet (YAG). The yttria-alumina ($Y_2O_3$—$Al_2O_3$) system exhibits several other stable phases, including $Y_2O_3$ (yttria), monoclinic $Y_4Al_2O_9$ (YAM [yttrium aluminum monoclinic]), hexagonal or orthorhombic $YAlO_3$ (perovskite or YAP [yttrium aluminum perovskite]) and $Al_2O_3$ (alumina). These alternative thermodynamic phases do not share the same optical characteristics as YAG. Unfortunately, the current state-of-the-art process steps useful in the manufacture of YAG ceramics or YAG powders may lead to the formation of these undesired phases. Powders or films composed of these alternative thermodynamic phases may be converted to the desired garnet phase upon application of suitable additional heat treatment/annealing at high temperatures, but this may dramatically increase total processing time and cost. Heating or annealing may also result in sintering of the particles which may cause loss of control of particle size.

Thus there is a need for a suitable process for generating phase-pure garnet materials using processes suitable for continuous production without resorting to subsequent thermal annealing steps. There also may be a need to improve control of particle size.

SUMMARY OF THE INVENTION

Some embodiments comprise a process for making a plurality of substantially phase-pure garnet particles, the process comprising: subjecting a dispersion of precursors to a solvothermal treatment to form a garnet intermediate, wherein the dispersion comprises compounds of at least two different elements which are dispersed in a medium, and wherein each element is independently selected from groups II, III, IV, V, VI, VII, VIII, or Lanthanide metals; and applying a flow-based thermochemical process to said garnet intermediate to thereby form a plurality of substantially phase-pure garnet particles.

Some embodiments comprise a process for preparing a plurality of substantially phase-pure garnet particles comprising: providing at least a first precursor compound comprising element A and a second precursor compound comprising element D, wherein elements A and D are present at about the stoichiometric ratio of the garnet particles; heating at least the first and the second precursor compounds in the presence of a solvent to form a solvothermal intermediate, said heating being carried out under pressure to a temperature above the normal boiling point of the solvent; and providing a flow of the solvothermal intermediate and heating the flow to a temperature of at least about 500° C.

DETAILED DESCRIPTION

Figure 1:
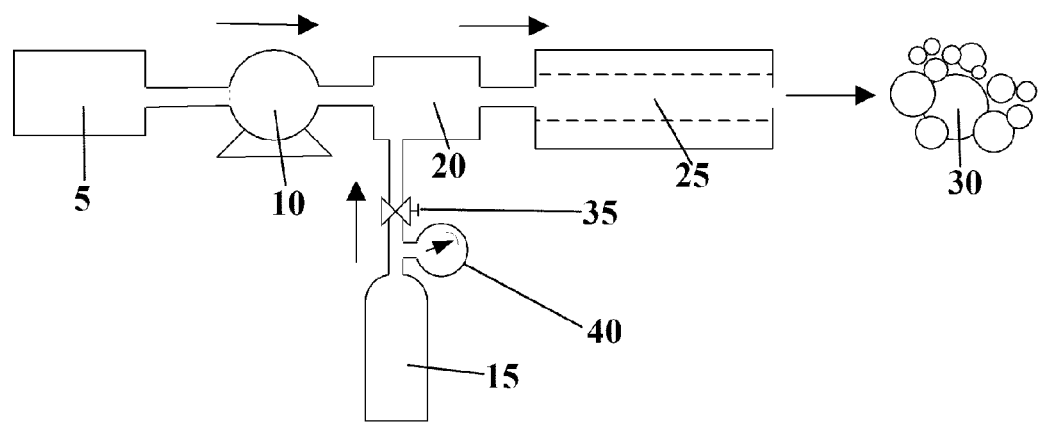
FIG. 1 shows a schematic of some embodiments of a flow-based thermochemical particle generation system.

The processes disclosed herein may be useful for preparing substantially phase-pure garnet particles. As used herein, the term "phase-pure" refers to a composition that is substantially one thermodynamic phase. Comparison of the x-ray diffraction pattern of a given standard and the produced sample is one of a number of methods that may be used to determine whether the sample is phase-pure. For example, a composition having substantially no other phase but YAG, as determined by a lack of reflections corresponding to non-YAG phases by conventional x-ray diffraction, is phase-pure. Exemplary standards include those XRD spectra provided by the National Institute of Standards and Technology (NIST) (Gaithersburg, Md., USA) and/or the International Centre for Diffraction Data (ICDD, formerly the Joint Committee on Powder Diffraction Standards [JCPDS]) (Newtown Square, Pa., USA).

As used herein, the term "garnet" has the ordinary meaning known to a person of ordinary skill in the art. In some embodiments, the term "garnet" may refer to the tertiary structure of an inorganic compound, such as a mixed metal oxide.

In some embodiments, the garnet may be composed of oxygen and at least two different elements independently selected from groups II, III, IV, V, VI, VII, VIII, or Lanthanide metals. For example, the garnet may be composed of oxygen and a combination of two or more of the following elements: Ca, Si, Fe, Eu, Ce, Gd, Tb, Lu, Nd, Y, La, In, Al, and Ga.

In some embodiments, a synthetic garnet may be described as $A_3D_2(EO_4)_3$, wherein A, D, and E are elements selected from group II, III, IV, V, VI, VII, VIII elements, and Lanthanide metals. In some embodiments, element E may be the same as element D, and the garnet may have the formula $A_3D_5O_{12}$. A, D, and E may either represent a single element, or they may represent a primary element that represents the majority of A, D, or E, and a small amount of one or more dopant elements also selected from group II, III, IV, V, VI, VII, VIII elements, and Lanthanide metals. Thus, the formula may be expanded to:

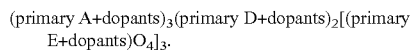

(primary A+dopants)$_3$(primary D+dopants)$_2$[(primary E+dopants)O$_4$]$_3$.

In a garnet particle, the primary element or dopant element atom of A (e.g., $Y^{3+}$) may be in a dodecahedral coordination site or may be coordinated by eight oxygen atoms in an irregular cube. Additionally, the primary element or dopant element atom of D (e.g., $Al^{3+}$, $Fe^{3+}$, etc.) may be in an octahedral site. Finally, the primary element or dopant element atom of E (e.g., $Al^{3+}$, $Fe^{3+}$, etc.) may be in a tetrahedral site.

In some embodiments, a garnet can crystallize in a cubic system, wherein the three axes are of substantially equal lengths and perpendicular to each other. In some embodiments, this physical characteristic may contribute to the transparency or other chemical or physical characteristics of the resulting material. In some embodiments, the garnet may be yttrium iron garnet (YIG), which may be represented by the formula $Y_3Fe_2(FeO_4)_3$ or $(Y_3Fe_5O_{12})$. In YIG, the five iron (III) ions may occupy two octahedral and three tetrahedral sites, with the yttrium(III) ions coordinated by eight oxygen ions in an irregular cube. In YIG, the iron ions in the two coordination sites may exhibit different spins, which may result in magnetic behavior. By substituting specific sites with rare earth elements, for example, interesting magnetic properties may be obtained.

Some embodiments comprise phase-pure metal oxide garnets, such as $Y_3Al_5O_{12}$ (YAG) or $Gd_3Ga_5O_{12}$ (GGG), which may have desired optical characteristics such as transparency or translucency. In these embodiments, the dodecahedral site can be partially doped or completely substituted with other rare-earth cations for applications such as phosphor powders for electroluminescent devices. In some embodiments, specific sites are substituted with rare earth elements such as cerium. In some embodiments, doping with rare earth elements or other dopants may be useful to tune properties such as optical properties. For example, some doped compounds can luminesce upon the application of electromagnetic energy. In phosphor applications, some embodiments are represented by the formula $(A_{1-x}RE_x)_3D_5O_{12}$, wherein A and D are divalent, trivalent, quadrivalent or pentavalent elements; A may be selected from, for example, Y, Gd, La, Lu, Yb, Tb, Sc, Ca, Mg, Sr, Ba, Mn and combinations thereof; D may be selected from, for example, Al, Ga, In, Mo, Fe, Si, P, V and combinations thereof; and RE may be rare earth metal or a transition element selected from, for example, Ce, Eu, Tb, Nd, Pr, Dy, Ho, Sm, Er, Cr, Ni, and combinations thereof. This compound may be a cubic material having useful optical characteristics such as transparency, translucency, or emission of a desired color.

In some embodiments, the garnet may comprise yttrium aluminum garnet, $Y_3Al_5O_{12}$ (YAG). In some embodiments, YAG may be doped with neodymium ($Nd^{3+}$). YAG prepared as disclosed herein may be useful as the lasing medium in lasers. Embodiments for laser uses may include YAG doped with neodymium and chromium (Nd:Cr:YAG or Nd/Cr:YAG); Erbium-doped YAG (Er:YAG), Ytterbium-doped YAG (Yb:YAG); Neodymium-cerium double-doped YAG (Nd:Ce:YAG, or Nd, Ce:YAG); Holmium-chromium-thulium triple-doped YAG (Ho:Cr:Tm:YAG, or Ho, Cr,Tm:YAG); Thulium-doped YAG (Tm:YAG); and Chromium (IV)-doped YAG (Cr:YAG). In some embodiments, YAG may be doped with cerium ($Ce^{3+}$). Cerium-doped YAG may be useful as phosphors in light emitting devices, e.g., light emitting diodes and cathode ray tubes. Some embodiments include dysprosium-doped YAG (Dy:YAG); and terbium-doped YAG (Tb:YAG), which may also be useful as phosphors in light emitting devices.

The garnet particles may be of any size or shape. For example, in some embodiments, at least about 95%, about 98%, about 99%, or about 99.9% of the number of the garnet particles may have a diameter that is at least about 10 nm, about 50 nm, or about 100 nm. Similarly, the garnet particles may have a diameter up to about 0.5 μm, about 5 μm, about 10 μm, about 100 μm, or larger. In some embodiments, the garnet particles may be substantially spherical.

In some embodiments, a precursor composition (e.g., a dispersion of precursors or precursor compounds) may be heated to form an intermediate composition (e.g., a garnet intermediate). Some embodiments comprise subjecting a dispersion of precursors to a solvothermal treatment to form a garnet intermediate. Some embodiments comprise heating compounds of the elements composing the garnet in the presence of a solvent to form a solvothermal intermediate. In some embodiments, the dispersion of precursors comprises precursor compounds dispersed in a solvent. The precursor compounds are the sources of elements found in the garnet. In some embodiments, the precursor compounds may also provide the source for the dopants.

In some embodiments, the precursor composition being heated is a dispersion. For example, in some embodiments the dispersion may be a mixture comprising a liquid medium and one or more additional solid or liquid phases (such as solid or liquid phases comprising compounds of the group II-VIII, or Lanthanide elements of the composition). The different phases may be dispersed among one another. For example, in some embodiments, a second liquid phase may be dispersed in the liquid medium. In some embodiments, one or more solid phases may be dispersed in the liquid medium. The dispersion may be aqueous, where the liquid is primarily water, or the dispersion may be organic, where the liquid is primarily one or more organic compounds, or the dispersion may have any mixture of water, other inorganic and organic compounds.

In some embodiments, the precursor may be a compound of at least one element composing the garnet. In some embodiments, the dispersion of precursors may comprise at least two compounds providing different elements independently selected from groups II, III, IV, V, VI, VII, VII VIII, or Lanthanide metals. In some embodiments, the dispersion of precursors may comprise a lanthanide metal compound, wherein the lanthanide metal may be selected from Ce, Eu, Gd, Tb, Lu, Pr, La, Lu, Ho, Sm, Dy, Er, Tm Pm or Nd. In some embodiments, one of the precursor compounds may be a group III metal compound selected from Y, La, Gd, Lu, In, Al or Ga.

In some embodiments, the dispersion of precursors may comprise a source (e.g. a chemical species or compound) of yttrium, aluminum, or cerium. Examples may include, but are not limited to, aluminum isopropoxide, aluminum t-butoxide, aluminum ethoxide, aluminum lactate, aluminum oxide, aluminum nitrate, aluminum sulfate, aluminum phosphate, alumatrane, aluminum acetylacetonate, yttrium acetate, yttrium acetylacetonate, yttrium butoxide, yttrium isopropoxide, yttrium proprionate, yttrium nitrate, yttrium oxide, yttrium phosphate, yttrium sulfate, cerium acetate, cerium acetylacetonate, cerium butoxide, cerium isopropoxide, cerium nitrate, cerium oxide, cerium phosphate, cerium sulfate and mixtures thereof. Some embodiments may comprise an iron source, a yttrium source, and an optional dopant (e.g. any dopant listed above) source. Some embodiments may comprise a gadolinium source and an yttrium source. Some embodiments may comprise a gallium source and a gadolinium source. In some embodiments, the precursor composition being heated may comprise alumatrane, yttrium(III) acetate tetrahydrate and cerium(III) acetate monohydrate.

In some embodiments, the precursor composition is prepared by providing at least a first precursor compound comprising element A and a second precursor compound comprising element D, wherein elements A and D are present at about the stoichiometric ratio of the garnet particles. In some embodiments, a third precursor compound comprising element E is also provided. In some embodiments, a precursor compound comprising dopant element can also be added to the precursor composition.

In some embodiments, the ratio of the non-oxygen elements (e.g., A, D and E) in the dispersion of precursors is about the stoichiometric ratio of the same elements in the garnet. Examples of such elements include but are not limited to Ce, Eu, Gd, Yb, Tb, Lu, Nd, Y, La, In, Al, and Ga. The stoichiometric ratio is about the ratio of the respective number of atoms present in the final garnet phase. For example, in some embodiments, the dispersion comprises a yttrium source and an aluminum source wherein the molar ratio of yttrium to aluminum (Y:Al) is about 3:5. In some embodiments, this 3:5 molar ratio of yttrium to aluminum corresponds to a $Y_3Al_5O_{12}$ garnet. In some embodiments, the dispersion comprises a yttrium source, a dopant source, and an aluminum source. In these embodiments, the molar ratio of [yttrium+dopant] to aluminum ((Y+dopant):Al) is about 3:5. In some embodiments, this corresponds to a $(Y+dopant)_3Al_5O_{12}$ garnet. In some embodiments, the dopant is selected from cerium, europium, praseodymium, and neodymium. In some embodiments, the cerium, europium, praseodymium, and/or neodymium dopants represent between about 0.0001% and about 20% of the atomic concentration of yttrium in the dispersion. In other words, the ratio of yttrium to dopant to aluminum (Y:dopant:Al) is from about 2.9997:0.0003:5 to about 2.4:0.6:5. In some embodiments, the ratio of yttrium to dopant to aluminum (Y:dopant:Al) is about 2.97:0.03:5. In some embodiments, any of the above ratios may correspond to the ratios of yttrium, dopant, and aluminum in the garnet product.

The solvent may be any solvent such as water or an organic solvent. An organic solvent may be any organic compound which is liquid at the appropriate temperatures. Some examples include alcohols, e.g, methanol, ethanol, isopropanol, etc.; diols, e.g., pentanediol, butanediol, hexanediol, etc.; and glycols, e.g., ethylene glycol, propylene glycol, etc. In some embodiments, the solvent comprises a diol such as 1,5-pentanediol and water.

A composition described above may be heated under pressure. The heating may occur above the normal boiling point of the solvent (i.e. its boiling point under a pressure of 1 atmosphere) or the normal boiling point of the composition. In some embodiments, the composition is subjected to a solvothermal treatment. Solvothermal treatment in general refers to heating a composition in a sealed vessel so that the composition can be heated to a temperature above its normal boiling point in order to effect a change in the physical or chemical composition or properties of the composition. In some embodiments, the solvothermal treatment comprises disposing a dispersion in a sealed chamber and heating the dispersion to a peak temperature. The peak temperature is higher than the normal boiling point of the solvent medium and is below the critical pressure of the medium. In some embodiments, solvothermal treatment comprises disposing a dispersion in a sealed chamber having an interior pressure, elevating the interior pressure to an initial interior pressure, and heating the dispersion to a peak temperature higher than the normal boiling point of the medium and below the critical temperature and pressure of the medium. In some embodiments, the interior pressure is elevated prior to heating the dispersion in the chamber. In some embodiments, the dispersion in the sealed chamber is under an inert atmosphere, such as helium, neon, argon, krypton, xenon, radon, nitrogen, etc. In some embodiments, the inert atmosphere is helium, neon, argon, or nitrogen. In some embodiments, the inert atmosphere is argon or nitrogen.

In some embodiments, if desired, the interior pressure of the sealed chamber may be adjusted after the heating begins either to change the pressure or to keep the pressure constant. This may occur by applying external pressure, by releasing vapor, or by the increase in the vapor pressure of any contents due to heating. In some embodiments, the initial interior pressure is from about 100, about 200 psi, or about 300 psi, to about 800 psi, about 1500 psi, or about 2500 psi. In some embodiments, the interior pressure is maintained at about 600 psi. In some embodiments, the interior pressure is adjusted to about 300 psi before heating by charging the sealed chamber with $N_2$.

The amount of time the heating occurs depends upon the particular composition being heated. In some embodiments, heating may occur for about 0.5 hr to about 10 hours, for about 2 to about 5 hours, or for about 3 hours.

In some embodiments, the peak temperature is between about 100° C. or about 200° C. to about 400° C. or about 600° C. In some embodiments, the peak temperature is about 300° C. In some embodiments, the solvothermal treatment comprises heating the composition at about 300° C. and 600 psi for about 3 hours. In some embodiments, this heating at about 300° C. and 600 psi occurs under an atmosphere comprising $N_2$ gas.

Heating the composition as described above produces an intermediate such as a solvothermal intermediate or a garnet intermediate. For example, subjecting the dispersion of compounds of yttrium and aluminum to solvothermal treatment may form a yttrium-aluminum garnet intermediate. Similarly, heating precursor compounds of elements composing a garnet in the presence of a solvent may form a solvothermal intermediate. The term "intermediate" may refer to any of a variety or range of compositions that are a direct or indirect product of a heat treatment. An "intermediate" may also include any composition that is a direct or indirect product of a heat treatment and is undergoing a flow-based thermochemical process, but is not a plurality of substantially phase-pure garnet particles. In other words, an "intermediate" may refer to any composition that has been subjected to a heat treatment, but which has either not yet been subjected to a flow-based thermochemical process, or is being subjected to a thermochemical process, but has not been transformed into a plurality of substantially phase-pure garnet particles.

An intermediate may be a solid or liquid, and the liquid may be a solution or a dispersion of some form. In some embodiments, an intermediate may have visible solid or liquid particles dispersed within it. In some embodiments, an intermediate may be substantially transparent, meaning that suspended solids may not be discernable via visual inspection or light scattering techniques such as dynamic light scattering In some embodiments, a flow-based thermochemical process may be applied to an intermediate formed by a heating process described above. A flow-based thermochemical process may be a process which comprises heating a flow of a composition, such as an intermediate (e.g., solvothermal intermediate), rapidly enough to reach the desired temperature while the composition is flowing. In some embodiments, a flow-based thermochemical process may be applied to a garnet intermediate. The flow-based thermochemical process comprises suspending the garnet intermediate in a carrier fluid or gas to form a flow, and passing the flow into a reaction field, such as a hot zone generated by a plasma source, a flame, or the like, to thereby form the plurality of substantially phase-pure garnet particles. In some embodiments, the flow may be provided by any of a number of means known in the art. For example, in some embodiments, a flow of an intermediate in a gas phase or an aerosol phase may be provided. The gas phase intermediate may be diluted by a carrier gas. A flow of an intermediate in an aerosol phase refers to a flow in which the intermediate is in the form of small solid or liquid particles, and the composition is suspended or dispersed in a carrier fluid or gas. This may comprise nebulizing or atomizing the intermediate to form an aerosol.

FIG. 1 depicts a schematic of a non-limiting example of some embodiments of a flow-based thermochemical process for the continuous synthesis of phase-pure garnet phase particles. A source 5 of an intermediate from a solvothermal process may be pumped by an optional fluid pump 10 and premixed, atomized, nebulized or vaporized with a carrier gas stream 15 in a premixing, atomization, nebulization, or vapor delivery apparatus 20 to create the appropriate gaseous or aerosol dispersion. A valve 35 may be used to control the flow of the atomizing, nebulizing, or carrier gas (referred to hereafter as "carrier gas"). In some embodiments, controlling the flow of the carrier gas may provide control of the flow ratio of the carrier gas to the intermediate. A flow meter or pressure gauge 40 may be used to accurately control such flow. Exemplary methodologies of gas phase processes and aerosol processes are discussed in WO2008112710 A1, which are incorporated by reference herein. If the intermediate is converted to an aerosol, the apparatus 20 may be an atomizer, such as a two fluid atomizer, or a nebulizer. In some embodiments, the flow rate of the intermediate and the carrier gas are independent. Thus, for example, the liquid may have a flow rate of from about 0.5 mL/min to about 1000 mL/min, or about 5 mL/min to about 100 mL/min. Similarly, for example, the carrier gas may have a flow rate of about 0.5 slm to about 500 slm, or about 5 slm to about 50 slm.

The carrier gas may be any gas. In some embodiments the carrier gas can be an inert or otherwise non-reactive gas such as helium, neon, argon, krypton, xenon, radon, nitrogen or a combination thereof, wherein the carrier gas is non-reactive with the intermediate. In some embodiments, the carrier gas can be a mixture consisting of at least one reactive gas which may participate in the reaction to form garnet particles. Exemplary carrier gases include but are not limited to nitrogen, argon, helium, air, oxygen, hydrogen, carbon dioxide, methane, etc. In some embodiments, the carrier gas is nitrogen or argon. In some embodiments, the carrier gas is argon.

In some embodiments, the resulting aerosol may comprise droplets of any size capable of being delivered into a plasma or capable of being subject to any other flow-based thermochemical process. For example, the droplets may have a diameter of about 10 nm to about 500 μm, or about 200 nm to about 100 μm.

In a flow-based thermochemical process, the flow is subjected to a thermochemical or heating process to provide garnet particles. For example, returning to FIG. 1, the resulting gas-phase or aerosol provided by the deliver apparatus 20 may be fed into the thermal reactor 25 to provide garnet particles 30. The source of such thermal energy is unimportant as long as the sample is heated sufficiently and rapidly for the sample to be heated to the desired temperature while the sample is flowing. In some embodiments, the source of thermal energy may be internal energy, heat of reaction, conductive, convective, radiative transfer from other heat sources, inductive-coupled, microwave, sonochemical, electromagnetic, direct or pulsed electric arc, flame pyrolysis or combinations thereof. In some embodiments, a flow-based thermochemical process may be a thermal plasma based gas-phase or aerosol process, flame spray pyrolysis, or spray pyrolysis. In some embodiments, the heating and subsequent cooling rates may be at least about $10^{3\circ}$ C./s or about $10^{4\circ}$ C./s, up to about $10^{6\circ}$ C./s, or about $10^{7\circ}$ C./s. In some embodiments, the solvothermal treatment may help to avoid contaminants. In some embodiments, the solvothermal treatment may allow good control over particle shapes and sizes. In some embodiments, the process allows for continuous production (e.g. not batch production).

Figure 2:
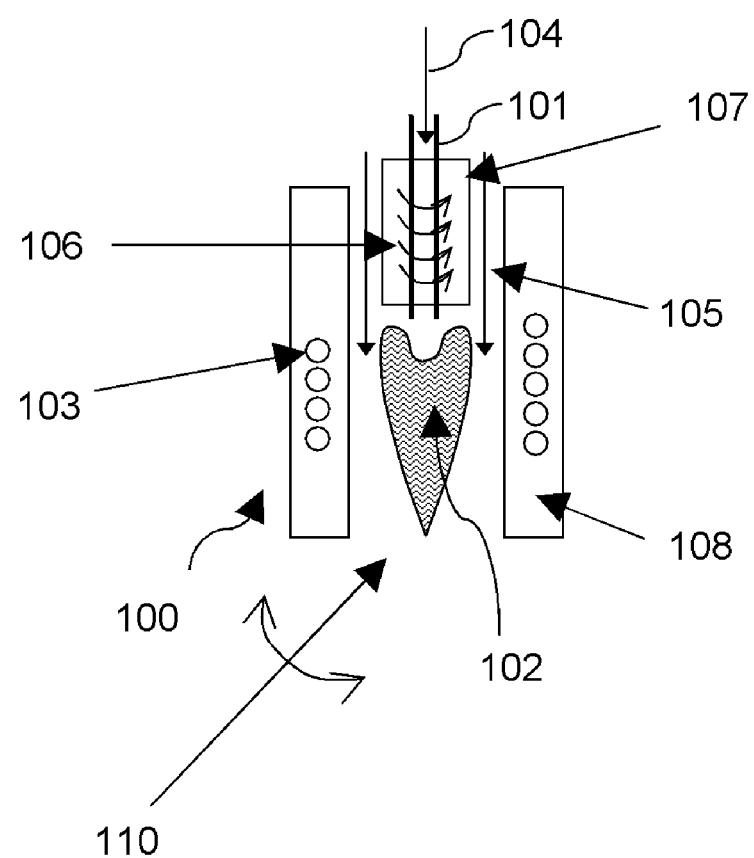
FIG. 2 shows a schematic of a RF plasma torch.

Some embodiments comprise delivering an intermediate into a plasma torch such as an inductively-coupled radio frequency (RF) plasma torch and applying the RF inductively-coupled plasma to the precursor. FIG. 2 depicts an inductively-coupled RF plasma torch 100 related to some embodiments. In some embodiments, the aerosol or gas-phase mixture of precursor and carrier gas 104 (e.g. formed by a vaporizer, atomizer, or nebulizer 20 as shown in FIG. 1) may be introduced into the plasma torch 100 via an injector 101, which leads to the central region 102 of the plasma torch 100. In some embodiments, an aerosol phase may be formed via two-fluid atomization discharged directly into the RF plasma. In some embodiments, the aerosol phase may be formed using a remote nebulizer and then delivered to the RF plasma. The plasma 102 may be generated by powering the current carrying coils 103, and maintained within a discreet volume by the inner flow containment tube 107 and outer plasma confinement tube 108. Gas flow of the plasma forming gas within the discreet volume may be maintained and controlled by an axially directed sheath gas flow 105 and a swirling central gas flow 106. Quench gas, if any, may be symmetrically injected at various angles to the plasma torch axis at the exit 110 of the torch. In some embodiments, a quench gas is supplied at an exit of a hot zone of the plasma, meaning a point where the flow exits the hot area of the plasma, such as 110 in FIG. 2. In some embodiments, the quench flow 110 may be applied at any angle between about 0° to about 90° with respect to the axis of the plasma torch. In other words, in some embodiments, the quench flow 110 may be applied about transverse to the plasma torch axis (hence transverse to the plasma) or may be applied in about a direction opposing the plasma flow, or any direction in between. In some embodiments, the quench flow rate, direction and symmetry may be changed to affect the particle size without altering the phase purity of the material.

The temperature of a flow-based thermochemical process may vary. For example, the temperature in the reaction field may range from at least about 500° C. or about 800° C., about 1000° C., to about 10,000° C. or about 20,000° C. In some embodiments, at least a portion of the reaction field has a temperature of at least about 1000° C.

Injecting an intermediate into a plasma torch may lead to a transformation of the vapor-phase or aerosol phase precursor into solid particles of phase-pure garnet material. In some embodiments, this may be accomplished by a combination of evaporation, decomposition, and nucleation. In some embodiments, as soon as the solid particles start forming, a quench gas is introduced. The quench gas may be a single gaseous chemical species or a mixture of gaseous chemical species. In some embodiments, rapid quenching may contribute to powder homogeneity, uniformity in size, the maintenance of submicron particle size and overall control over the particle size. In some embodiments, the quench gas may comprise one or more reactive or non-reactive gases. In some embodiments, the quench gas may comprise a mixture of gases with at least one reactive gas component which participates in a chemical reaction to form the final garnet particles. In some embodiments, examples of reactive gases may include, but are not limited to, oxygen, air, ammonia, and methane. Examples of non-reactive gases may include, but are not limited to, argon, helium, nitrogen, and hydrogen. In some embodiments, a mixture of at least one reactive gas and at least one non-reactive gas may be used as a quench gas. The flow rate for the quench gas may be about 0.1 slm (standard liters per minute) to 1000 slm, about 10 slm to about 500 slm, or alternatively, about 10 slm to about 100 slm.

Related pending patent applications entitled "Nanoscale phosphor particles with high quantum efficiency and method of synthesizing the same" (publication number WO2008112710 A1), or U.S. Pat. No. 7,112,758 and US patent publication number US 2007/0029291 A1, the contents of which are incorporated by reference herein, may be adapted for use in the methods described herein.

EXAMPLE 1

Alumatrane (AlN[CH$_2$CH$_2$O]$_3$, 32.48 g, Gelest, Morrisville, Pa., USA), yttrium(III) acetate tetrahydrate (Y(CH$_3$CO$_2$)$_3$.×4H$_2$O, 19.03 g, Sigma Aldrich, St. Louis, Mo., USA), and cerium(III) acetate monohydrate (Ce(CH$_3$CO$_2$)$_3$.×H$_2$O, 190 mg, Sigma Aldrich, St. Louis, Mo., USA) with Ce/(Y+Ce))=1.0 at. % were dissolved in 1,5-pentanediol (400 ml) in a glass inner vessel and the resulting solution was stirred at room temperature overnight. The atomic ratio of the precursors were: 5 atoms of aluminum: 2.97 atoms of yttrium:0.03 atoms of cerium (i.e. 1% cerium doping in place of yttrium). Cerium was added to replace about 1% of yttrium atoms in the mixture i.e. Ce:Y=1:99 so that the final cerium-doped YAG would be represented by the formula $(Y_{0.99}Ce_{0.01})_3Al_5O_{12}$. The glass vessel was then placed in a 1000 mL autoclave (Yamato Sterilizer SE 510, Yamato Scientific America, Inc., Santa Clara, Calif., USA). Additional solvent 1,5-pentanediol (20 mL) was poured into the gap between the autoclave wall and the glass vessel) and purged with N$_2$ for 10 min. The autoclave was then pre-charged with N$_2$ to reach 300 psi, and heated to 300° C. at a rate of ~3° C./min with stirring at 300 rpm. During the heating, the inner pressure gradually increased to reach 550 psi (sometimes the pressure release valve needed to be adjusted to keep the pressure between 550-600 psi). After heating at 300° C., 550 psi for 4 hours, the reaction was allowed to cool to room temperature to obtain a slightly brownish clear solution of a garnet intermediate or a solvothermal intermediate.

The intermediate was in the form of a substantially transparent liquid which did not have any crystalline components dissolved or suspended in it. On drying or precipitation of solid content the residues did not show any crystalline signature as determined using X-ray diffraction. The intermediate was diluted either with water or a C$_{1-3}$ alcohol (solvent: precursor in 1:1 to 1:5 ratio by volume), and delivered in the form of small droplets (200 nm-100 μm diameter) using Argon carrier gas (5-50 slm) through a two-fluid atomizer directly into a radio frequency inductively-coupled plasma torch. The precursor flow rate varied between 5 to 100 ml/min. After passing through the hot zone of the plasma (PL-35 model plasma torch, Tekna Sherbrooke, Canada) operated at 10-25 kW, Argon (central gas) process gas 10-20 slm (standard liters per minute), 40-80 slm sheath gas), the precursor underwent a direct transition to crystalline yttrium aluminum garnet micro and nanoparticles which were collected from the effluent gas on a glass fiber filter.

Figure 3:
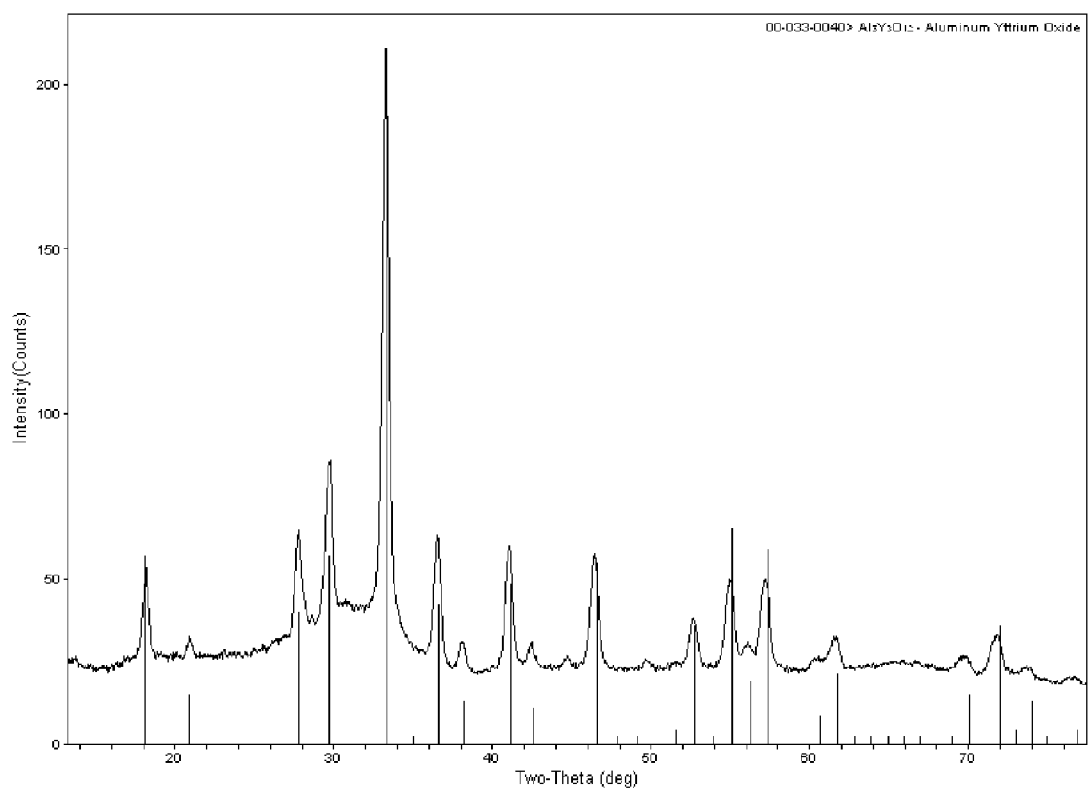
FIG. 3 shows the x-ray diffraction (XRD) pattern of a YAG ($Y_3Al_5O_{12}$) powder obtained according to some embodiments as compared to the pattern of a National Institute of Standards and Technology (NIST) standard YAG (Joint Committee on Powder Diffraction Standards (JCPDS) card number 00-033-0040).
Figure 4:
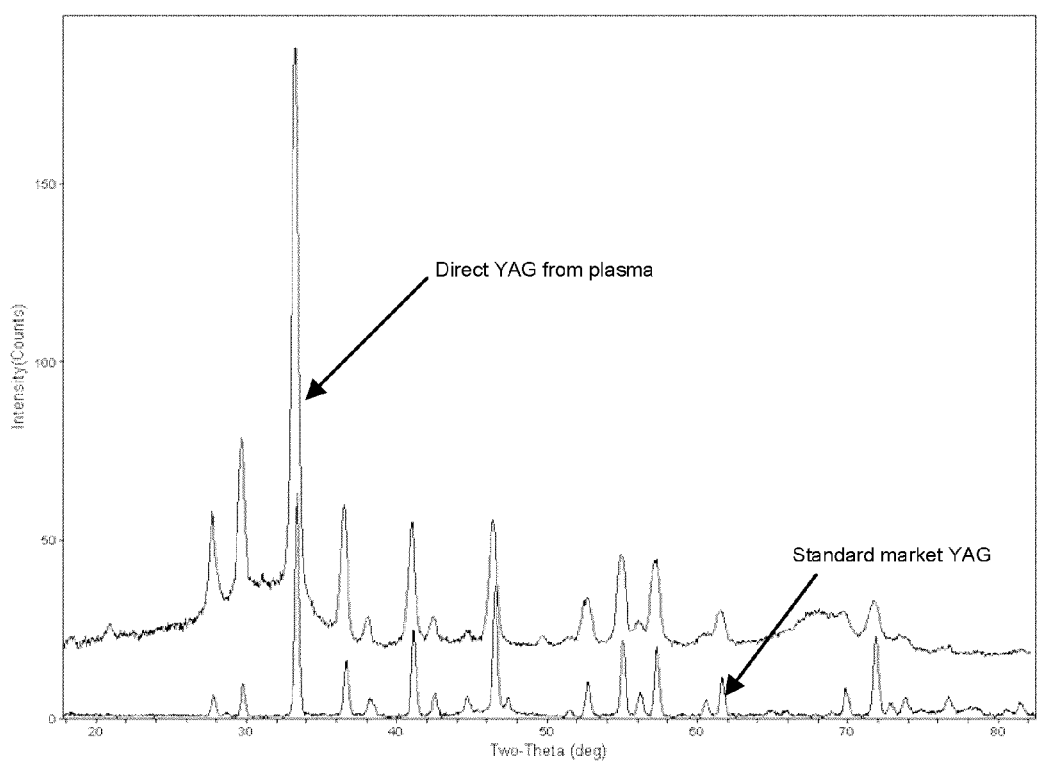
FIG. 4 shows the XRD pattern of a YAG powder obtained according to some embodiments as compared to the XRD pattern of a commercially available standard YAG.

FIG. 3 shows that the x-ray diffraction (XRD) pattern of the obtained YAG powder using the process described in Example 1 compared with the spectra of a NIST standard YAG (NIST standard YAG JCPDS card number 00-033-0040). The pattern of the obtained YAG powder and the NIST substantially match. This shows that the powder obtained from this process, without any post production heating, is substantially phase-pure yttrium aluminum garnet (YAG). FIG. 4 also shows that the YAG powder obtained from this process is substantially pure because its XRD pattern matches the XRD pattern of a commercially available pure YAG (P46-Y3 from Kasei Optonics, Kanagawa, Japan).

EXAMPLE 2

Figure 5:
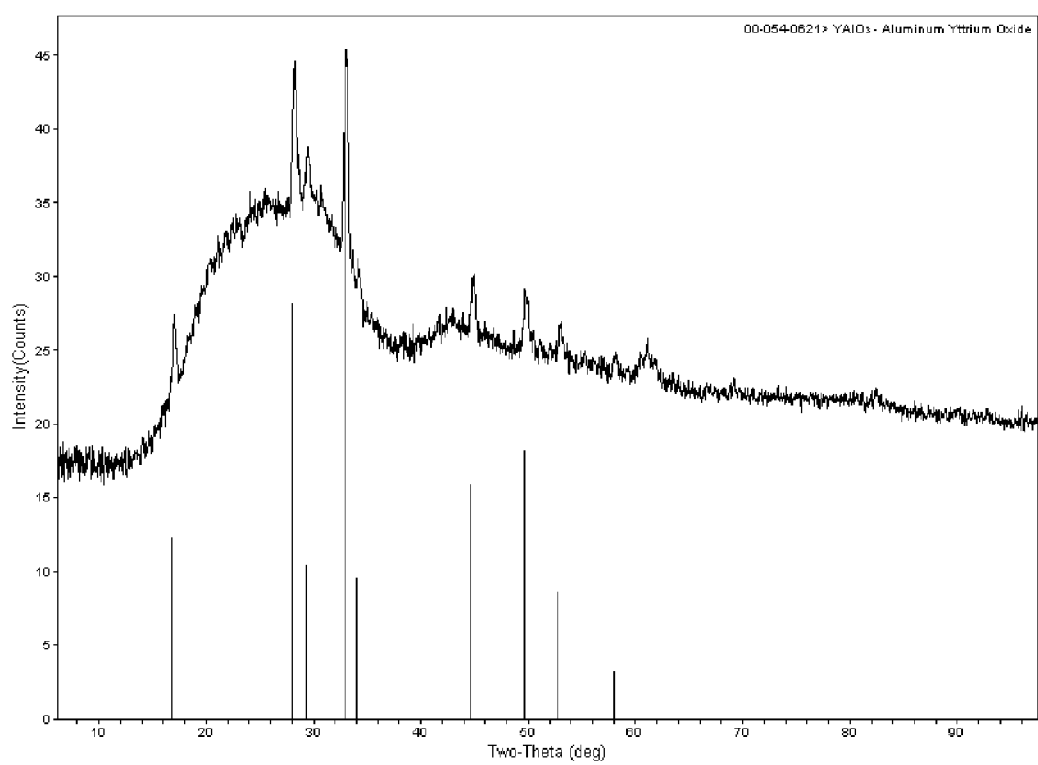
FIG. 5 shows the XRD pattern of a product obtained from according to some embodiments compared to a YAP (yttrium aluminum perovskite) standard JCPDS card number 00-054-0621.

Alumatrane (AlN[CH$_2$CH$_2$O]$_3$, 32.48 g, Gelest, Morrisville, Pa., USA), yttrium(III) acetate tetrahydrate (Y(CH$_3$CO$_2$)$_3$.×4H$_2$O, 19.03 g, Sigma Aldrich, St. Louis, Mo., USA), and cerium(III) acetate monohydrate (Ce(CH$_3$CO$_2$)$_3$.×H$_2$O, 190 mg, Sigma Aldrich, St. Louis, Mo., USA) with Ce/(Y+Ce))=1.0 at. % were dissolved in 1,5-pentanediol (400 ml) in a glass vessel. The atomic ratio of the precursors were: 5 atoms of aluminum:2.97 atoms of yttrium: 0.03 atoms of cerium (i.e. 1% cerium doping in place of yttrium). Cerium was added to replace about 1% of yttrium atoms in the mixture i.e. Ce:Y=1:99 so that the final cerium-doped YAG would be represented by the formula $(Y_{0.99}Ce_{0.01})_3Al_5O_{12}$. This mixture was diluted by adding water and fed into the RF plasma using the same plasma process parameters as Example 1 but without the solvothermal treatment. Collected particles were analyzed using XRD. The XRD pattern shows that the product was amorphous mixed with a small amount of YAP (yttrium aluminum perovskite) as seen in FIG. 5 (YAP, JCPDS card number 00-054-0621, shown as the bottom set of peaks).

EXAMPLE 3

118.66 g Aluminum nitrate nonahydrate, 71.80 g yttrium (III) nitrate hexahydrate and 0.10 g cerium(III) nitrate hexahydrate (from Sigma Aldrich, St. Louis, Mo., USA) [with an atomic ratio of: 5 atoms of aluminum:2.97 atoms of yttrium:0.03 atoms of cerium (i.e. 1% cerium doping in place of yttrium)] were dissolved in water to create a 0.4M solution.

Figure 6:
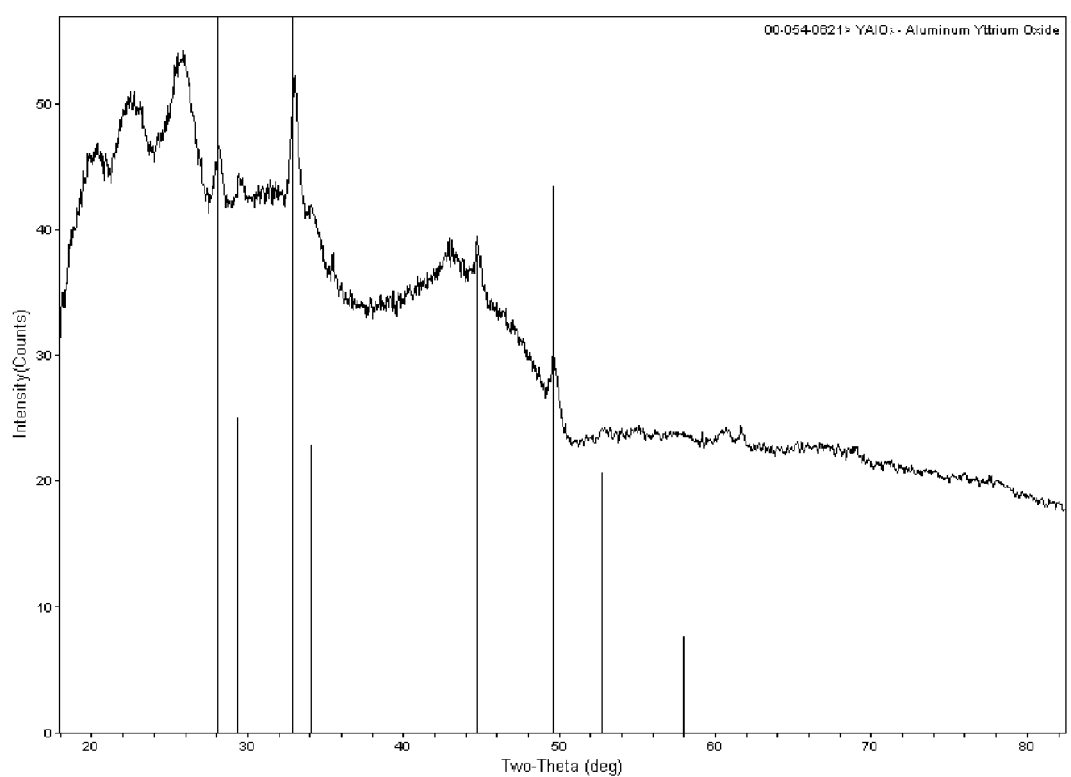
FIG. 6 shows the XRD pattern of a product obtained according to some embodiments compared to a YAP (yttrium aluminum perovskite) standard JCPDS card number 00-054-0621.

Cerium was added to replace about 1% of yttrium atoms in the mixture i.e. Ce:Y=1:99 so that the final cerium-doped YAG would be represented by the formula $(Y_{0.99}Ce_{0.01})_3Al_5O_{12}$. Without undergoing solvothermal process, this solution was introduced into a RF plasma using the same plasma process parameters as in Example 1. XRD analysis showed the presence of amorphous materials and YAP as shown in FIG. 6 (YAP, JCPDS card number 00-054-0621 shown as the bottom set of peaks).

Figure 7:
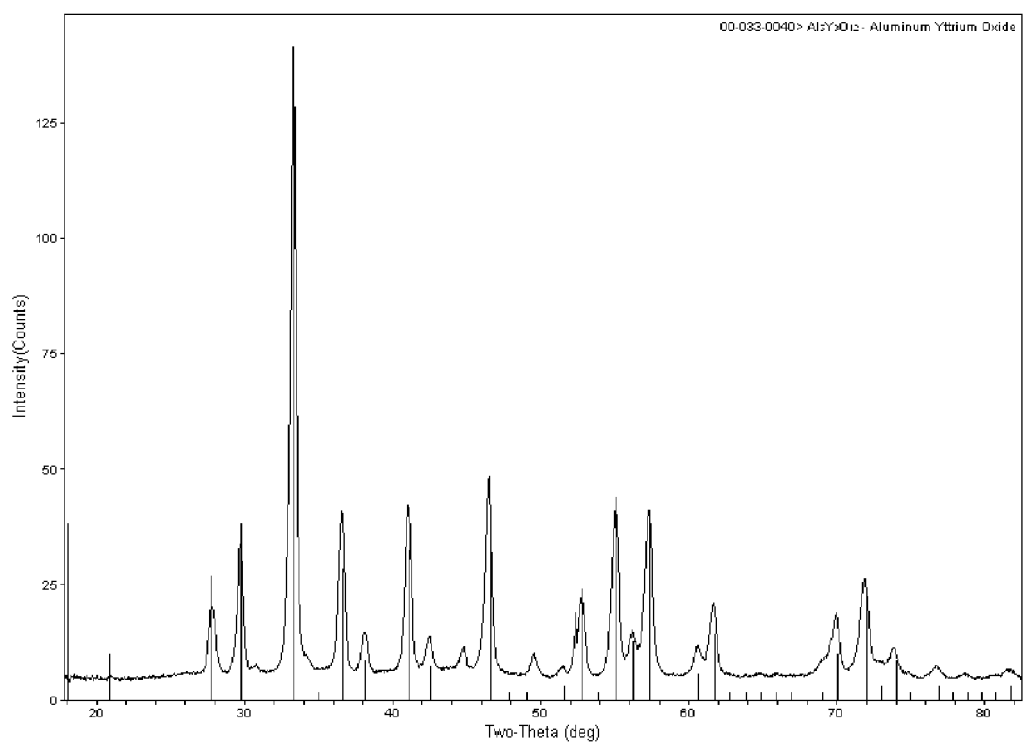
FIG. 7 shows the XRD pattern of a product obtained according to some embodiments after the product had been annealed to 1000° C. as compared to the pattern of a NIST standard YAG (JCPDS card number 00-033-0040).

By annealing the amorphous powder formed in Example 3 to 1000° C., pure-phase YAG particles were obtained as indicated by the XRD pattern shown in FIG. 7.

It will be appreciated by those skilled in the art that various omissions, additions and modifications may be made to the processes described above without departing from the scope of the invention, and all such modifications and changes are intended to fall within the scope of the invention.

What is claimed is:

1. A process for making a plurality of substantially phase-pure garnet particles, the process comprising:
    subjecting a dispersion of precursors to a solvothermal treatment to form a garnet intermediate, wherein the dispersion comprises compounds of at least two different elements which are dispersed in a medium, and wherein each element is independently selected from Groups II, III, IV, V, VI, VII, or VIII of the Periodic Table of Elements, or Lanthanide metals; and
    applying a flow-based thermochemical process to said garnet intermediate to thereby form a plurality of substantially phase-pure garnet particles, wherein the solvothermal treatment comprises:
        disposing the dispersion of precursors in a sealed chamber, and
        heating the dispersion of precursors to a peak temperature higher than the normal boiling point of the medium and below the critical temperature and pressure of the medium.

2. The method of claim 1, wherein the flow-based thermochemical process is an aerosol-based process.

3. The method of claim 1, wherein 95% of the number of the garnet particles are characterized by a particle diameter of between about 10 nm and about 100 µm.

4. The method of claim 1, wherein the 95% of the number of the garnet particles are characterized by a particle diameter of between about 10 nm and about 10 µm.

5. The method of claim 1, wherein 95% of the number of the garnet particles are characterized by a particle diameter of between about 50 nm and about 0.5 µm.

6. The process of claim 1, wherein the garnet intermediate is substantially transparent.

7. The process of claim 1, wherein the flow-based thermochemical process comprises applying an inductively coupled radio frequency (RF) thermal plasma to a flow comprising the garnet intermediate.

8. The process of claim 1, wherein applying a flow-based thermochemical process comprises:
    suspending the garnet intermediate in a carrier fluid or gas; and
    passing the carrier fluid or gas comprising the garnet intermediate into a reaction field generated by a plasma source to thereby form the plurality of substantially phase-pure garnet particles.

9. The process of claim 8, further comprising supplying a quench gas at an exit of a hot zone of the plasma.

10. The process of claim 8, wherein the plasma source is a radio frequency (RF) thermal plasma torch.

11. The process of claim 8, wherein at least a portion of the reaction field has a temperature of at least about 1000° C.

12. The process of claim 1, wherein the dispersion of precursors comprises an yttrium source, an aluminum source and a cerium source.

13. The process of claim 1, wherein the dispersion of precursors comprises an iron source and an yttrium source.

14. The process of claim 13, wherein the dispersion of precursors further comprises a dopant source.

15. The process of claim 1, wherein the dispersion of precursors comprises a gadolinium source and an yttrium source.

16. The process of claim 1, wherein the dispersion of precursors comprises a gallium source and a gadolinium source.

17. The process of claim 1, wherein the garnet particles comprise yttrium aluminum garnet.

18. The process of claim 1, wherein the garnet particles comprise a dopant.

19. The process of claim 1, wherein the garnet particles are substantially spherical.

20. The process of claim 1, wherein each element is independently selected from Ca, Si, Fe, Eu, Ce, Gd, Tb, Lu, Nd, Y, La, In, Al, or Ga.

21. A process for making a plurality of substantially phase-pure garnet particles, the process comprising:
    subjecting a dispersion of precursors to a solvothermal treatment to form a garnet intermediate, wherein the dispersion comprises compounds of at least two different elements which are dispersed in a medium, and wherein each element is independently selected from Groups II, III, IV, V, VI, VII or VIII of the Periodic Table of Elements, or Lanthanide metals; and
    applying a flow-based thermochemical process to said garnet intermediate to thereby form a plurality of substantially phase-pure garnet particles wherein the solvothermal treatment comprises:
        disposing the dispersion of precursors in a sealed chamber having an interior pressure;
        elevating the interior pressure of the sealed chamber to an initial interior pressure; and
        heating the dispersion of precursors to a peak temperature higher than the normal boiling point of the medium and below the critical temperature and pressure of the medium, wherein the elevating step occurs prior to the heating step.

22. The process of claim 21, further comprising adjusting the interior pressure of the sealed chamber after the heating begins.

23. The process of claim 21, wherein the dispersion of precursors in the sealed chamber is under an inert atmosphere.

24. The process of claim 21, wherein the initial interior pressure is about 100 psi to about 2500 psi.

25. The process of claim 21, wherein the peak temperature is about 100° C. to about 600° C.

26. A process for preparing a plurality of substantially phase-pure garnet particles comprising:
    a. providing at least a first precursor compound comprising element A and a second precursor compound comprising element D, wherein elements A and D are present at about the stoichiometric ratio of the garnet particles, and wherein A is selected from Y, Gd, La, Lu, Yb, Tb, Sc, Ca, Mg, Sr, Ba, Mn, or combinations thereof, and wherein D is selected from Al, Ga, In, Mo, Fe, Si, P, V, and combinations thereof;

b. heating at least the first and the second precursor compounds dispersed within a medium to a peak temperature higher than the normal boiling point of the medium and below the critical temperature and pressure of the medium, wherein said heating forms a solvothermal intermediate; and c. providing a flow of the solvothermal intermediate and heating the flow to a temperature of at least about 500° C.

27. The process of claim 26, wherein the solvent is an organic solvent.

28. The process of claim 26, wherein at least the first and the second precursor compounds are heated to a temperature of from about 100° C. to about 600° C.

29. The process of claim 26, wherein the flow of the solvothermal intermediate is heated to a temperature of from about 500° C. to about 20,000° C.

* * * * *

UNITED STATES PATENT AND TRADEMARK OFFICE
CERTIFICATE OF CORRECTION

PATENT NO. : 8,206,672 B2
APPLICATION NO. : 12/500956
DATED : June 26, 2012
INVENTOR(S) : Mukherjee et al.

It is certified that error appears in the above-identified patent and that said Letters Patent is hereby corrected as shown below:

Title Page, in column 2 (page 1 item 56) at line 15, Under Other Publications, change "Hydroxyaptite" to --Hydroxyapatite--.

Title Page, in column 2 (page 1 item 56) at line 43, Under Other Publications, change "Ind um" to --Indium--.

In column 2 at line 62, Change "(Gaitherburg," to --(Gaithersburg,--.

In column 5 at line 12 (approx.), Change "proprionate," to --propionate,--.

In column 5 at line 14, Change "scattering" to --scattering.--.

In column 11 at line 33-34, In Claim 1, change "chamber," to --chamber;--.

In column 11 at line 39, In Claim 2, change "method" to --process--.

In column 11 at line 41, In Claim 3, change "method" to --process--.

In column 11 at line 44, In Claim 4, change "method" to --process--.

In column 11 at line 44, In Claim 4, after "wherein" delete "the".

In column 11 at line 47, In Claim 5, change "method" to --process--.

In column 12 at line 37, In Claim 21, change "particles" to --particles,--.

Signed and Sealed this
Ninth Day of April, 2013

Teresa Stanek Rea
*Acting Director of the United States Patent and Trademark Office*